E. BELL.
MACHINE FOR CRACKING OFF GLASS BLANKS.
APPLICATION FILED OCT. 21, 1913.
1,168,275.  Patented Jan. 18, 1916.
3 SHEETS—SHEET 3.
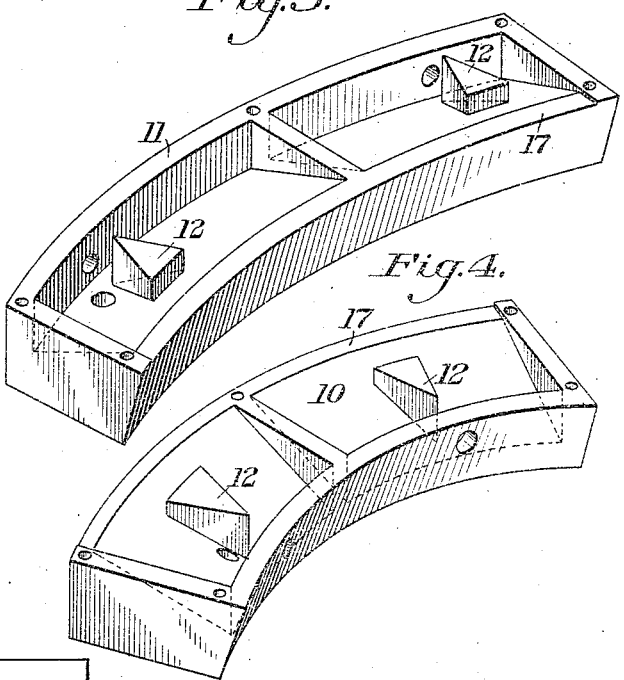
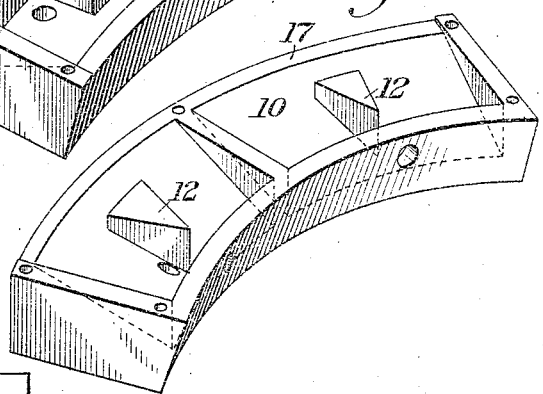
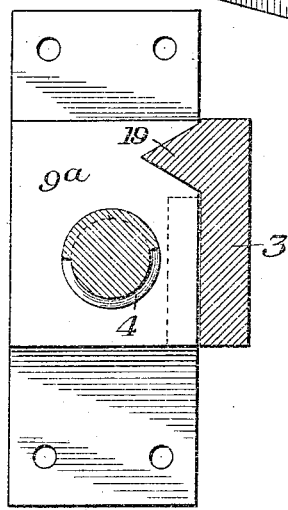
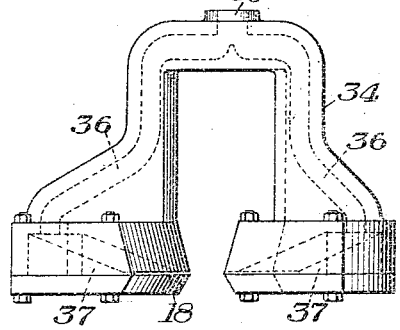
WITNESSES
R A Balderson
G. B. Fleming
INVENTOR
Elmer Bell
by Bakewell, Byrnes & Parmelee
Attys.

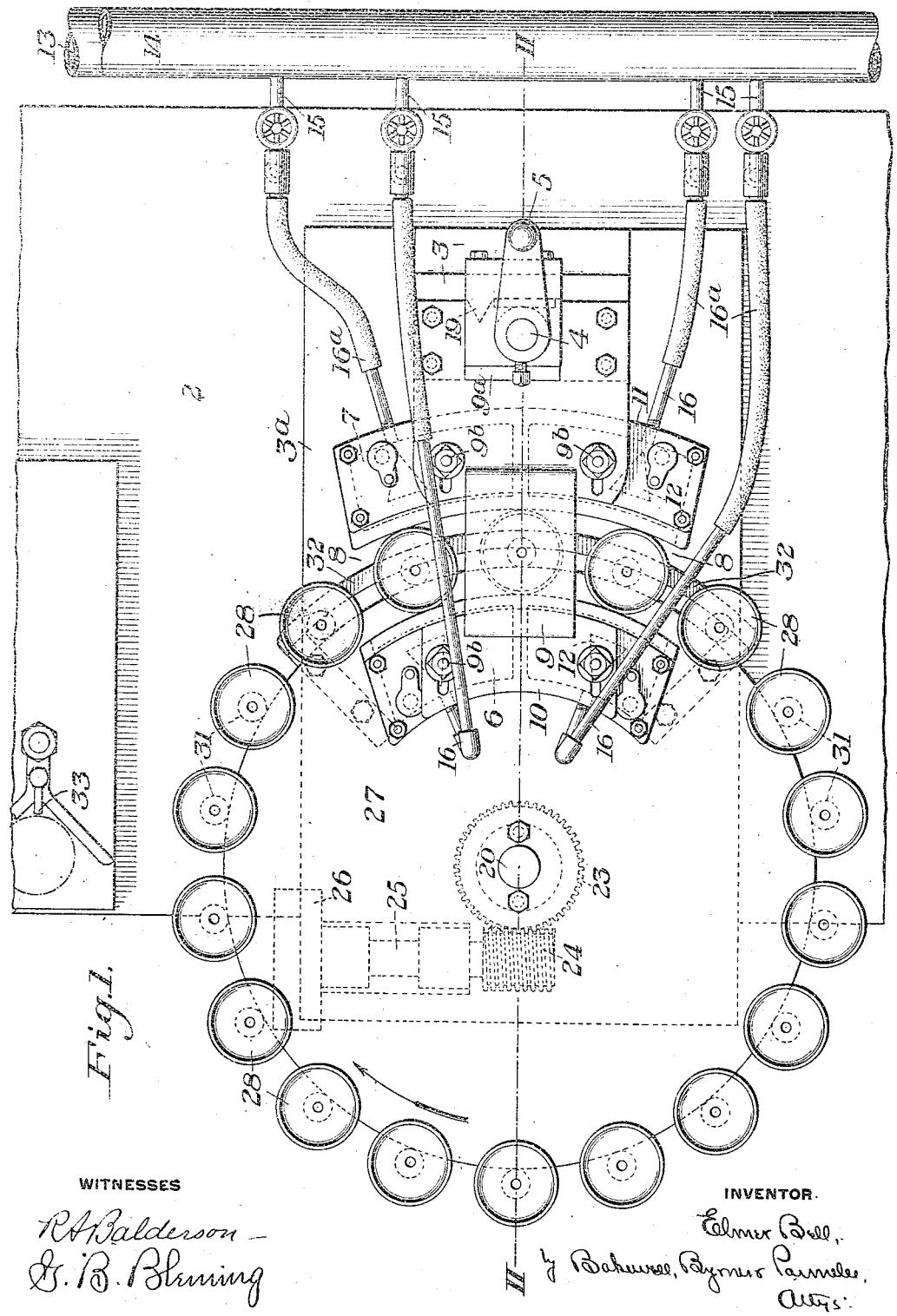

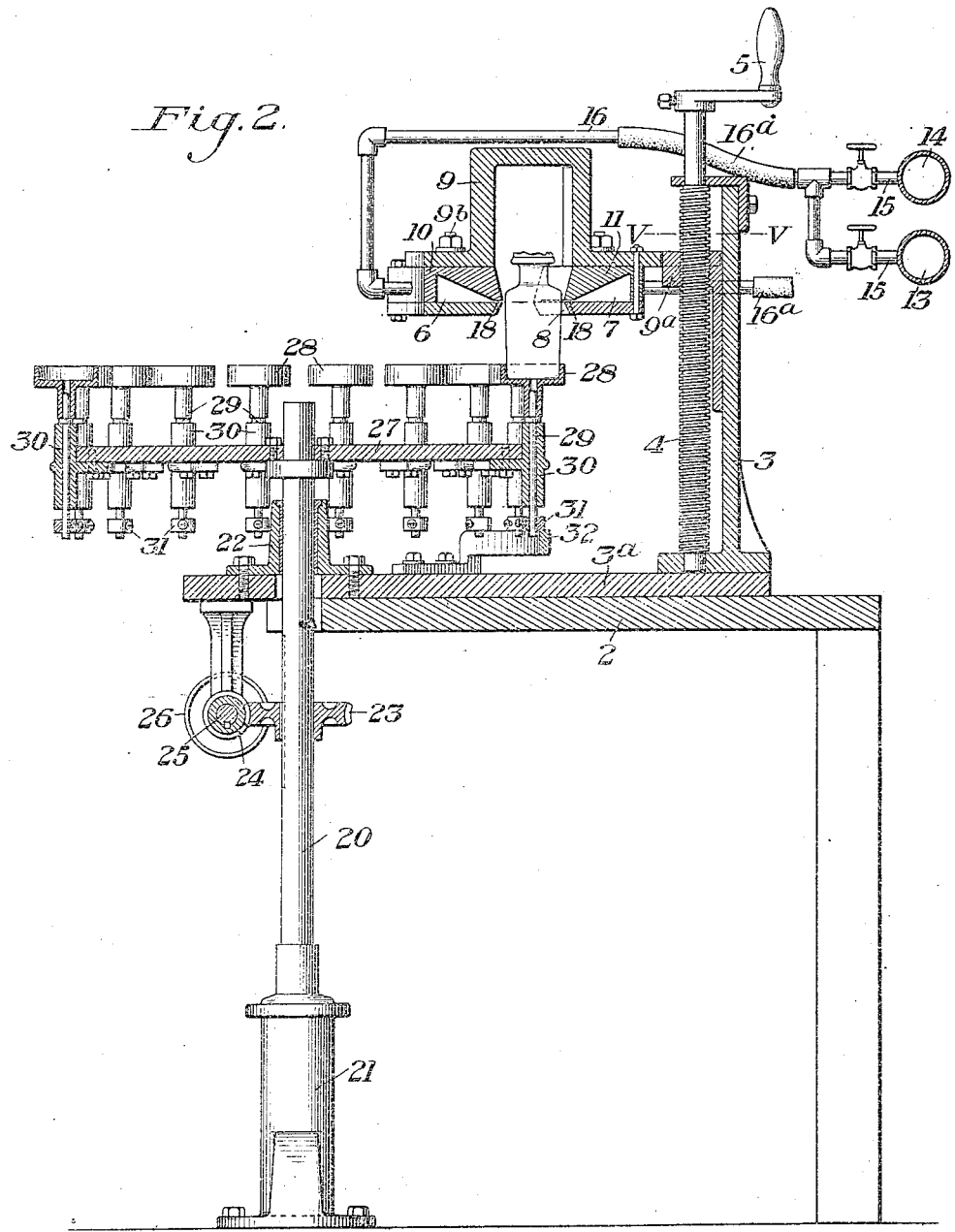

UNITED STATES PATENT OFFICE.

ELMER BELL, OF MOUNT PLEASANT, PENNSYLVANIA, ASSIGNOR TO BRYCE BROTHERS COMPANY, OF MOUNT PLEASANT, PENNSYLVANIA, A CORPORATION OF PENNSYLVANIA.

MACHINE FOR CRACKING OFF GLASS BLANKS.

1,168,275.  Specification of Letters Patent.  Patented Jan. 18, 1916.

Application filed October 21, 1913. Serial No. 796,434.

*To all whom it may concern:*

Be it known that I, ELMER BELL, a citizen of the United States, and resident of Mount Pleasant, Westmoreland county, Pennsylvania, have invented a new and useful Improvement in Machines for Cracking Off Glass Blanks, of which the following is a full, clear, and exact description, reference being had to the accompanying drawings, forming part of this specification, in which—

Figure 1 is a plan view of a machine embodying my invention; Fig. 2 is a vertical section on the line II—II of Fig. 1; Figs. 3 and 4 are inverted perspective views of the upper burner chamber members; Fig. 5 is a detail sectional view taken on the line V—V of Fig. 2; and Fig. 6 is a detail view showing, in side elevation, one modified form of the burner chambers.

My invention has relation to machines for cracking-off glass blanks such as tumbler blanks, goblet blanks, etc.; and is designed to provide a simple and efficient machine of this character by means of which the work can be rapidly and accurately carried out.

The nature of my invention will be best understood by reference to the accompanying drawings, in which I have shown the preferred embodiment thereof, and which will now be described, it being premised, however, that various changes can be made in the details of construction and arrangement of the various parts without departing from the spirit and scope of my invention as defined in the appended claims.

In these drawings, the numeral 2 designates a suitable bench, or other support, upon which is mounted a bracket 3. Journaled in this bracket is a vertical screw 4, having a handle 5, or other operating device, at its upper end. Carried by this screw is a divided burner chamber whose two parts 6 and 7 are separated from each other horizontally by a narrow throat or passage 8 which is of the proper width to permit the glass blanks to be cracked off to be carried therethrough in the manner hereinafter described. In the form shown in Figs. 1 to 4, inclusive, the two sections of the burner chamber are adjustably connected by a saddle 9 which extends over and across the passage 8. Each of the two sections is composed of a base and an upper member. The upper members, designated respectively as 10 and 11, are shown in detail in Figs. 3 and 4. They are of hollow form, closed at the top, and preferably provided with interiorly arranged distributer projections 12.

13 designates a gas supply pipe and 14 an air supply pipe, these pipes having connections 15 leading to the pipes 16 which convey the mixed gas and air into the chambers 6 and 7. Each of the members 10 and 11 is slightly cut away at its lower inner edge, as indicated at 17, so that when applied to the base members of the chambers there will be formed longitudinally extending narrow slits or openings 18 (see Fig. 2) through which the heated products of combustion are discharged in contact with opposite sides of the glass blanks.

Preferably, the two sections of the burner chamber are made adjustable toward and away from each other on the bolts $9^b$ which connect said sections to the saddle 9. By means of this adjustment, the width of this throat or passage 8 can be readily changed to suit the particular articles being operated upon. To permit this adjustment, the pipes 16 are provided with the flexible portions $16^a$.

The screw 4 provides means whereby the burner chamber may be accurately adjusted vertically with respect to the blanks; and the nut portion $9^a$ of the burner chambers which engages this screw is preferably provided with a V-shaped guide groove which is engaged by a correspondingly shaped guide projection 19 on the bracket 3.

20 designates a vertical shaft which is shown as journaled in its lower portion in a base or standard 21 and at its upper portion in a bearing 22 supported by the bracket base $3^a$. This shaft is driven by any suitable gearing such as the worm wheel 23, which is engaged by worm 24 on the shaft 25 having a driving pulley 26. Rigidly secured to the upper portion of the shaft 20 to rotate therewith is a carrier 27 upon which is mounted a circular series of blank supports 28. Each of these supports is carried by a vertical spindle 29, which is mounted in a bearing 30 on the carrier 27. Each spindle has a small friction driving wheel 31 secured to its lower end portion and adapted for contact with the upper edge of a segmental rail 32 which is concentric with and supported below the throat or passage 8. This throat or passage, as well as the rail 32, is concentric with the axis of the shaft 20.

The operation is as follows:—An attendant takes the blown blanks and brings them in contact with any suitable or usual scoring tool, such as the diamond point 33 (see Fig. 1). The scored blanks are then placed successively on the blank supports 28. The carrier 27 is rotated in the direction of the arrow in Fig. 1; and the blanks are carried successively through the throat or passage 8, in the manner indicated in Fig. 2. The burner chambers are adjusted to such a height that the score marks on the blanks will be brought substantially directly in the horizontal plane of the slits or openings 18. In this manner, as the blanks are carried through said passage 8 the hot products of combustion are discharged from these slits against the opposite sides of the blanks. While the blanks are passing through the throat 8 they are rotated by the engagement of the friction wheels 31 with the rail 32. The hot products of combustion being discharged in this manner against the scored blanks, the upper portions of the blanks are cracked off while moving through said passage.

In Fig. 6 I have shown a modified form of burner chamber. In this form, the two parts of the chamber are connected by the upwardly arched portion 34, having means at 35 for the connection thereto of a gas and air supply pipe. The portion 34 is provided with conduits or passages 36 for conducting the fuel mixture into burner chambers 37.

The advantages of my invention will be apparent to those skilled in the art, since it provides a machine of extremely simple construction and method of operation by which blown glass blanks may be very rapidly and cheaply cracked off. By proper initial adjustment of the burner chambers, no particular care on the part of the operator is required in order to bring the blanks into relation to the slits or openings of these chambers. All that the operators are required to do is to successively place the blanks on supports 28 at one side of the machine and remove the cracked off blanks from such supports at the opposite side of the machine.

It will be understood that the carrier 27 may be made of any suitable diameter so as to carry more or less supports than is indicated by the drawings; that the detail construction of these supports, the manner of rotating the same, and also the detail construction and arrangement of the burner chambers may be varied within the scope of the appended claims.

What I claim is:—

1. A machine of the character described, comprising a horizontal, rotatable carrier having a plurality of blank supports, each of said supports being mounted for separate rotation about a vertical axis while moving with the carrier, and the series of said supports being arranged in a circle on said carrier; a pair of segmental burners mounted over said carrier and having between them a curved space whose center line is directly over the center line of the series of blank supports and through which space the blanks are carried by the carrier, said burners having elongated discharge openings, and means for successively rotating the different blank supports while they are passing below the burners; substantially as described.

2. A machine of the character described, comprising a horizontal table, means for rotating said table, a circular series of blank supports each of which has a vertical spindle journaled in said table, a segmental rail below the carrier, means on the spindle for contact with said rail to rotate the spindle, and a segmental cracking off passage above said supports; substantially as described.

3. A machine of the character described, comprising a rotatable horizontal table having a plurality of blank supports, a vertical screw at one side of the said table, and oppositely arranged cracking-off burners mounted on said screw and projecting over one side of the carrier, said burners having a curved passageway between them for the passage of the blanks, together with flexible connections for supplying the burners; substantially as described.

In testimony whereof, I have hereunto set my hand.

ELMER BELL.

Witnesses:
J. LLOYD KALP,
LAWRENCE M. PFAADT.

Copies of this patent may be obtained for five cents each, by addressing the "Commissioner of Patents, Washington, D. C."